United States Patent [19]

Rokicki

[11] Patent Number: 4,943,677
[45] Date of Patent: Jul. 24, 1990

[54] MAKING POLY(ALKYLENE CARBONATES) OF CONTROLLED MOLECULAR WEIGHT

[75] Inventor: Andrzej Rokicki, Alburtis, Pa.

[73] Assignees: Air Products and Chemicals, Inc., Allentown; Arco Chemical Company, Newtown Square, both of Pa.; Mitsui Petrochemical Industries, Ltd., Tokyo, Japan

[21] Appl. No.: 363,579

[22] Filed: Jun. 8, 1989

[51] Int. Cl.$^5$ .................. C08G 64/02; C08G 64/34
[52] U.S. Cl. .................................................. 528/405
[58] Field of Search ........................................ 528/405

[56] References Cited

U.S. PATENT DOCUMENTS

| | | | |
|---|---|---|---|
| 3,706,713 | 12/1972 | Hull et al. | 528/408 X |
| 4,020,045 | 4/1977 | Baggett | 260/47 |
| 4,059,566 | 11/1977 | Baggett | 260/47 |
| 4,686,276 | 8/1987 | Myers | 528/405 X |
| 4,783,445 | 11/1988 | Sun | 528/405 X |
| 4,789,727 | 12/1988 | Sun | 528/405 |

FOREIGN PATENT DOCUMENTS 55-12156 1/1980 Japan .

OTHER PUBLICATIONS

Saga, et al, Makromol Chem., 179, 2837-2343 (1978).
Rokicki & Kuran, "The Application of Carbon Dioxide as a Direct Material for Polymer Synthesis in Polymerization and Polycondensation Reactions", J. Macromol. Sci-Rev. Macromol. Chem., C21(1), 135-136 (1981).
Soga, et al., Polymer Journal 13, pp. 407-410 (1981).
Soga, *Nippon Kagakkaishi*, vol. 2, 295-300 (1982).
Aida, et al Macromolecules 19, pp. 8-13 (1986).
R. W. Taft, *Journal of American Chemical Society*, vol. 75, p. 4538 (1953) "Linear Steric Energy Relationships".
G. W. Klumpp, *"Reactivity in Organic Chemistry"*, pp. 142-143, J. Wiley & Sons (1982).

*Primary Examiner*—Earl Nielsen
*Attorney, Agent, or Firm*—Richard A. Dannells, Jr.; James C. Simmons; William F. Marsh

[57] ABSTRACT

Poly(alkylene carbonates) of controlled molecular weight are made by copolymerizing carbon dioxide and one or more oxirane compounds using zinc polycarboxylate catalyst in the presence of a sterically hindered organic proton donor. The acidity of the donor is in the range of 3 to 20 p$K_a$ and the steric quality of the donor is such that it has a steric parameter ($E_s$) of $-0.38$ or less. The molecular weight of the polymer can be regulated by altering the level of proton donor over a range which does not adversely affect catalyst productivity. Benzoic acid and phenol are examples of suitable proton donors. The preferred catalyst is one made from zinc oxide and a dicarboxylic acid, such as glutaric acid or adipic acid.

14 Claims, No Drawings

MAKING POLY(ALKYLENE CARBONATES) OF CONTROLLED MOLECULAR WEIGHT

TECHNICAL FIELD

This invention relates to a method of copolymerizing carbon dioxide and epoxides to form a poly(alkylene carbonate) having controlled molecular weight. In another aspect, it relates to a method of regulating the molecular weight of polyalkylene carbonates by the addition of particular proton donors to the polymerizations involving carbon dioxide and epoxides with specific catalyst systems.

BACKGROUND OF THE INVENTION

It has been known for about two decades that high molecular weight polymers can be prepared by copolymerizing carbon dioxide with epoxy compounds in order to provide the corresponding poly(alkylene carbonates). These polymers exhibit unique chaining of the monomers by the alternate incorporation of carbon dioxide and epoxide moieties in the polymer chain. Because such high molecular weight polymers decompose cleanly, they find use in lost foam molding applications and as binders for ceramic or metallic particles in sintered molding procedures. The polymers can also be fabricated into films and other shaped articles and used in blends with other polymers for various applications such as adhesives. Tailoring the polymer to specific end uses, however, requires the molecular weight of the polymer to be controlled to a desired level and, in general, this has not been achievable without also decreasing the productivity of the catalyst employed.

The problem of molecular weight control occurs in many polymer systems. One of the proposed solutions to the problem is the addition of certain chain terminating agents which cut short the polymerization of the long chain molecule. For example, Baggett in U.S. Pat. Nos. 4,020,045 (1977) and 4,059,566 (1977) describes attempts to control the molecular weight of polycarbonates formed from phosgene and dihydric phenols by the addition of a metallic sulfite to the polymerization as a chain terminating agent, or the use of ammonia or ammonia compounds as chain terminators in the same polymerization. The polycarbonates formed from the reaction of phosgene and dihydric phenols result from a polycondensation reaction. The polycarbonates described in this invention are formed via an anionic coordination mechanism which is completely different in character from a polycondensation reaction. Therefore, the teachings of the Baggett reference do not apply to the process of this invention.

Soga, et al.. Makromol. Chem., 179, 2837-2343 (1978), discloses alternating copolymerization of carbon dioxide and epoxypropane in dioxane using a cobalt diacetate catalyst and acetic acid to decrease the number average molecular weight. Soga states that there is very little loss in yield of the polymer based on the catalyst and it is suggested that the acetic acid causes a chain transfer reaction. Other carboxylic acids, such as benzoic acid, chloroacetic acid, dichloroacetic acid and trichloroacetic acid were said to cause similar transfer reactions. The data presented, however, show that these other carboxylic acids produced significant reductions in yield. The reduction in yield when benzoic acid was used was over 90%. Also a small amount of epoxypropane homopolymer was produced in addition to the copolymer. Although a reference is made to acetic acid salts of chromium, zinc and nickel as other possible catalysts, no information is given on the effect of carboxylic acid in polymerizations using these catalysts.

Japanese Patent Application No. 55-12156, Ikeda, et al., Tokyo Institute of Technology (1980), discloses using cobalt acetate or diethyl zinc as a catalyst for copolymerizing carbon dioxide and an epoxy compound in the presence of various carboxylic acids; for example, acetic acid, benzoic acid, trichloroacetic acid, lactic acid and steric acid, in order to regulate the molecular weight. This appears to be based upon the same work reported by Soga, et al., cited above, in which the carboxylic acids other than acetic acid caused significant decreases in the productivity of the cobalt acetate catalyst.

Rokicki and Kuran, "The Application of Carbon Dioxide as a Direct Material for Polymer Synthesis in Polymerization and Polycondensation Reactions," J. Macromol. Sci.-Rev. Macromol. Chem., C21(1), 135-136 (1981), present a survey of scientific literature on the use of carbon dioxide in polymerization and polycondensation reactions and describe, inter alia, the copolymerization of carbon dioxide with oxiranes using organozinc catalysts, such as diethylzinc-pyrogallol and zinc carboxylates as well as metallo-organic catalysts of cobalt. chromium, nickel, magnesium and aluminum, thereby indicating that a relatively large number of catalysts are active in promoting the copolymerization between carbon dioxide and oxiranes. Catalysts based on diethylzinc predominate in reports on the alternate copolymerization of carbon dioxide and oxiranes, but coordination catalysts, for example, metal carboxylates, have been less widely studied. Zinc derivatives, however, are said to exhibit higher activity than derivatives of cobalt or cadmium, while derivatives of aluminum, magnesium, chromium and nickel lead to low molecular weight polymers. Some ability to control molecular weight is said to result from increasing the carbon dioxide pressure in order to increase number average molecular weight or increasing reaction temperature to decrease the molecular weight. An increase in reaction time to increase molecular weight is somewhat effective, although prolonged reaction periods may cause polymer degradation.

Soga, et al., Polymer Journal, 13, pages 407–410 (1981), discloses alternating copolymerization of carbon dioxide and propylene oxide with catalysts prepared from zinc hydroxide and dicarboxylic acids, but there is no suggestion of how the molecular weight of the polymers can be controlled when using this catalyst system.

Soga, Nippon Kagakkaishi, Vol. 2, 295–300 (1982), investigates several types of catalyst systems which promote alternate copolymerization of carbon dioxide and alkylene oxides as possible improvements over the known catalyst system of diethylzinc and water. These alternate catalysts include metal oxide-supported diethylzinc, acetic acid salts of cobalt and zinc, reaction products of zinc hydroxide and dicarboxylic acids and metal oxide-supported zinc, cobalt and aluminum halides. The zinc dicarboxylate formed by reacting zinc hydroxide with glutaric acid was said to be about 3 times as active as the diethyl zinc •$H_2O$ system, but the catalyst prepared by reacting zinc oxide with glutaric acid was said to offer no improvement at all over the diethylzinc •$H_2O$ system. Molecular weight of the polymers produced varies considerably with the choice of catalyst, and the only attempt to control the molecular weight for one specific catalyst system was with the use of acetic acid added to the catalyst system of cobalt acetate. It was reported that the yield of the polymer with respect to catalyst did not decrease, but the number average molecular weight of the polymer decreased in proportion to the acetic acid added.

Aida, et al. Macromolecules, 19, pages 8-13 (1986), discloses that when using a catalyst of aluminum porphyrin-triphenylphosphine to copolymerize carbon dioxide and epoxides, the molecular weight of the polymer can be regulated by the monomer-to-catalyst ratio. This, however, is typical for "living" catalyst systems. The same molecular weight control mechanism does not apply to zinc-based systems such as the zinc dicarboxylate described above. It is stated that although a number of catalyst systems are known, no other successful method of controlling molecular weight of the copolymer has been reported.

SUMMARY OF THE INVENTION

According to my invention, a method is provided for making a poly(alkylene carbonate) having a desired molecular weight by contacting under copolymerizing conditions an alkylene oxide and carbon dioxide in the presence of a catalytic amount of a zinc polycarboxylate catalyst and including in the polymerization mixture a sterically hindered organic proton donor. The amount of donor included is sufficient to reduce the molecular weight of the polyalkylene carbonate from that which would have been formed without the proton donor being present, but insufficient to reduce significantly the productivity of the catalyst over the course of the reaction. The process provides significant latitude in the amount of the proton donor which can be used and the variation of molecular weight made possible. In order to enjoy this range of levels over which it can be used, the proton donor should have an acidity in the range of 3 to 20 $pK_a$ and a steric parameter ($E_s$) of $-0.38$ or less, as defined by R. W. Taft in Journal of American Chemical Society, Vol. 75, page 4538 (1953), and further discussed by G. W. Klumpp, "Reactivity in Organic Chemistry", pages 142-143, J. Wiley & Sons (1982). By having acidity and steric structural characteristics which fall within these parameters, it is possible to have a proton donor which can terminate chain growth in the polymerization without reacting with the catalyst to reduce polymer yield. In the process described, the molecular weight of the product polymer can be altered by changing the amount of proton donor present in the polymerization system. The zinc polycarboxylate catalyst preferably has been formed by the reaction of zinc oxide, hydroxide, or a salt thereof. with a polycarboxylic acid or anhydride; for example, by reacting zinc oxide with glutaric acid or adipic acid. Polycarboxylate acids or anhydrides can be selected from dicarboxylates, tricarboxylates tetracarboxylates or polymeric compounds with pendant carboxylate functions.

DETAILED DESCRIPTION OF THE INVENTION

Carbon dioxide and and one or more oxirane compounds can be copolymerized with coordination catalysts, such as zinc (II) carboxylates to provide poly(alkylene carbonates) having number average molecular weights of about $1 \times 10^4$ to $1.5 \times 10^5$ which correspond to weight average molecular weights of about $5 \times 10^4$ to $8 \times 10^5$. In general, these molecular weights vary with catalyst composition and preparation method.

The oxirane compounds used in the polymerization have the general structural formula:

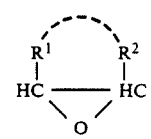

wherein $R^1$ is H, $CH_3$, $C_2H_5$, $C_3H_7$, $C_4H_9$, $C_6H_5$ or $C_6H_{11}$ and $R^2$ is H or $CH_3$. Additionally, $R^1$ and $R^2$ together can complete a ring compound as illustrated by the broken line.

The polymerization reaction of $CO_2$ with the oxirane compounds results in a polymer having covalently linked alkylene carbonate units. In the case of copolymerization of carbon dioxide and propylene oxide, the more active catalysts tend to give higher molecular weight polymers of propylene carbonate. The molecular weight of these poly(propylene carbonates) appears to be insensitive to changes of other process parameters. Attempts to use proton donors which were described as most effective in the prior art with respect to other catalyst systems, namely, acetic acid and glutaric acid, as chain transfer agents, met with little success because any molecular weight reduction of the copolymer was invariably accompanied by dramatic reduction in polymer productivity, often to the point of total deactivation of the system.

The catalyst which is used most effectively in this invention is a zinc dicarboxylate, which is the reaction product of a dicarboxylic acid or anhydride with zinc oxide, hydroxide or salt, such as zinc acetate or zinc carbonate. Preferably the catalyst is formed by using zinc oxide which is available commercially in consistent purities and reacting that compound with either glutaric acid or adipic acid. It is preferred to use an excess of zinc oxide, for example, about 2 to 5 mole % excess over the stoichiometric amounts required for the reaction. The solvent used should not contain active hydrogen atoms. and an aprotic solvent which contains oxygen heteroatoms and which azeotropes with water is preferred. Formation of an azeotrope is desired to assist in the removal of water formed during the reaction. Hydrocarbon solvents, such as toluene, which are immiscible with water can be used, as can solvents which contain no active hydrogen atoms but are miscible with water; for example, acetone, dioxane and the like, although these tend to give catalysts of intermediate activity.

The temperature of catalyst formation can vary from room temperature up to 50° C. for the initial reaction temperature, and the reaction usually occurs over a period of about 1 to 3 hours at 50° C. when using glutaric acid. The catalysts are produced as fine white powders that can be stored indefinitely under appropriate conditions.

The proton source for molecular weight control should be an organic compound which is sterically hindered and, preferably, soluble in the reaction mixture. Examples are provided below which outline the effect of the proton-bearing functional group on the molecular weight of the polymer produced and productivity of the catalyst system. The steric bulk of the substituent on the group, and the acidity, expressed as $pK_a$ of the proton source are important characteristics.

When the organic proton donors fall within the parameters of acidity and steric structure indicated, they will cause a reduction of molecular weight of the poly(alkylene carbonate) when present in the reaction mixture without decreasing in any significant amount the productivity of the catalyst. Productivity is given in terms of weight of polymer formed per unit weight of catalyst. The proton donor should have an acidity which is stronger than a $pK_a$ of 20; for example, stronger than indene. If highly acidic compounds are used with a $pK_a$ which is equal to or less than 2.87, the molecular weight control agent will kill the polymerization. Best results in controlling the number average molecular weight of the poly(alkylene carbonate) are achieved with a moderately sterically hindered proton donor, that is, one having an $E_s$ equal to −0.38 or below, and an intermediate acidity ($pK_a$ in the range of 3 to 20, and preferably between 3.6 and 10.6). Examples of suitable proton donors with characteristics falling within these ranges include phenol, 4-isopropylphenol, o-cresol, 2,6-dimethylphenol, bisphenol-A, phenylacetic acid, iso-butyric acid, cyclohexanecarboxylic acid, trimethylacetic acid, 2-propylpentanoic acid, benzoic acid, iso-propylbenzoic acid, m-chlorobenzoic acid, 9-anthracene carboxylic acid, and the like. These organic acidic materials have all been demonstrated to be effective for regulating the molecular weight of poly(propylene carbonate) when made with a catalyst of zinc (II) glutarate, as demonstrated by the following examples. These examples are presented to illustrate the various embodiments of my invention and should not be construed to limit my invention unduly.

EXAMPLE 1

(Comparative Example)

Two methods, A and B, were used to prepare zinc dicarboxylate catalysts which were then used to copolymerize carbon dioxide and propylene oxide to produce various products of poly(propylene carbonate).

Catalyst Preparation Method A

To a one liter, three neck, round bottom flask equipped with stirrer, condenser and heating bath was added 0.50 moles zinc oxide (Fisher reagent grade) and 350 ml. an aprotic solvent. To this was added 0.45 moles of glutaric acid dissolved or slurried in the reaction solvent. The mixture was heated for 4 hours at 55° C. with vigorous stirring. On cooling, the solids were filtered off and dried overnight in a vacuum oven at 80° C.

Catalyst Preparation Method B

To a one liter, three neck, round bottom flask equipped with stirrer, condenser, Dean-Stark trap and heating bath was added 0.50 moles zinc oxide (Fisher reagent grade) and 350 ml an aprotic solvent. To this was added 0.45 moles of glutaric acid dissolved or slurried in the reaction solvent. The mixture was heated for 2 hours at 55° C. with vigorous stirring. The mixture was then brought to reflux and held there until azeotropic removal of water ceased. On cooling, the solids were filtered off and dried overnight in a vacuum oven at 80° C.

Polymerization

Three to five gm. of zinc carboxylate catalyst prepared according to the procedure described in Method A or B was placed in the bottom section of a 300 ml. capacity Parr stirred autoclave reactor. The reactor body and catalyst were heated in a nitrogen purged oven at 125° C. for 8-10 hours, then cooled to room temperature while maintaining the nitrogen atmosphere. The autoclave body was transferred to a gloved dry box where 150 gm. of methylene chloride and 50 gm. of propylene oxide were added. Both materials were reagent grade chemicals, and had been dried and stored over 4A molecular sieves. The autoclave head was attached to the body and the entire assembly was transferred to a pressure cell. The reactor was connected to nitrogen and $CO_2$ sources via a three way valve. The autoclave was pressurized to 300 psi with $N_2$, slowly vented to atmospheric pressure and re-pressurized to 250 psi with $CO_2$. The reactor was then heated to an internal temperature of 85° C. The $CO_2$ pressure increased to 450 psi and was maintained at this level throughout the course of the polymerization via a constant pressure feed valve. After 4 hours the reactor was cooled to room temperature, the pressure was released and the contents of the reactor were emptied into a crystallizing dish. The solvent and unreacted propylene oxide were allowed to evaporate under ambient conditions for 12 hours, then the residue was dried under vacuum at room temperature for an additional 12 hours. The white, leathery polymeric material obtained was weighed to determine gross yield. After correcting the gross weight for the amount of catalyst charged, the catalyst efficiency was reported as grams of polymer produced per gram of catalyst used.

Further analysis of the crude and purified product by FTIR and NMR analysis showed the polymer to have a 1:1 alternating structure. The zinc carboxylate catalysts studied in this work produced negligible amounts of methanol soluble polyether polymer. According to literature reports, the latter materials were usually present as by-products when diethylzinc based catalysts were used. The crude product was shown to contain 3-5% of cyclic propylene carbonate by-product by FTIR. The amount of cyclic by-product formed was relatively constant in all runs using zinc carboxylate catalysts.

Data showing catalyst productivity and molecular weights of the polymer obtained with the catalyst systems prepared by methods A and B described above are shown in Table 1.

TABLE 1

| Catalyst Productivity (gms polymer/gm catalyst) | Preparation Method | Polymer Molecular Weight $M_n \times 10^{-3}$ |
|---|---|---|
| 5 | A | 36 |
| 7 | A | 80 |
| 9 | A | 77 |
| 17 | A | 111 |
| 29 | B | |
| 21 | A | 98 |
| 26 | B | 116 |

The above data show that as catalyst productivity is increased there is a corresponding increase in molecular weight of the polymer formed. Conversely if molecular weight is to be reduced in this fashion, loss in catalyst productivity is inevitable.

EXAMPLE II (Comparative Example)

Copolymerization of carbon dioxide and propylene oxide using a zinc (II) glutarate catalyst prepared as described for method A of Example I and at various process conditions of temperature, time, carbon dioxide pressure and solvent were carried out and the results are summarized in Table 2. Glutaric acid was used to form the zinc glutarate.

TABLE 2

| PROCESS VARIABLES | | | | |
|---|---|---|---|---|
| TEMP [°C.] | Time [h] | $P_{CO_2}$[psig] | Solvent | MOL. WT. $M_n \times 10^{-3}$ |
| 85 | 4 | 350 | $CH_2Cl_2$ | 95.0 |
| 85 | 4 | 350 | 1,4 Dioxane | 99.6 |
| 85 | 4 | 350 | Anisole | 95.2 |
| 85 | 4 | 500 | $CH_2Cl_2$ | 99.0 |
| 70 | 4 | 820 | $CH_2Cl_2$ | 74.0 |
| 85 | 4 | 450 | Hexane | 107.0 |
| 95 | 5 | 350 | $CH_2Cl_2$ | 105.0 |
| 95 | 10 | 350 | $CH_2Cl_2$ | 109.0 |
| 95 | 20 | 350 | $CH_2Cl_2$ | 99.0 |
| 105 | 5 | 350 | $CH_2Cl_2$ | 112.0 |

The data of Table 2 show that even though the conditions of temperature, time of reaction, carbon dioxide pressure and the solvent selected varied considerably, these process variables did not have a pronounced effect on molecular weight of the polymer produced.

EXAMPLE III (Comparative Example)

A polymerization as described for Example II except using hexane as the solvent, a reaction temperature of 85° C., 450 psig carbon dioxide and a reaction time of 4 hours, was empolyed and glutaric acid at various levels was used in an effort to control the molecular weight of the polymer. The results are shown in Table 3.

TABLE 3

| GLUTARIC ACID LOADING (moles/gm catalyst) | POLYMER | |
|---|---|---|
| | Productivity [g/g] | $M_n \times 10^{-3}$ |
| None | 9.6 | 98 |
| $7.65 \times 10^{-5}$ | 7.8 | 32 |
| $3.82 \times 10^{-4}$ | 6.0 | 17 |
| $7.65 \times 10^{-4}$ | 2.1 | 9 |

As can be seen from the data of Table 3, glutaric acid was successful in reducing the molecular weight of the polymer product, but with a corresponding loss in catalyst productivity. Reducing molecular weight at the expense of catalyst productivity has always been an option, so this technique offers no solution to the long standing problem of molecular weight control for the copolymerization of carbon dioxide with oxirane compounds.

EXAMPLE IV (Comparative Example)

In a process similar to Example III, carbon dioxide and 200 ml propylene oxide were copolymerized using zinc (II) glutarate catalyst in 700 ml hexane at 80° C. for 2 hours and 142 psig carbon dioxide (at room temperature), using acetic acid as a transfer agent to regulate molecular weight of the product. The results are shown in Table 4.

TABLE 4

| Acetic Acid Loading (moles/gm catalyst) | Polymer | |
|---|---|---|
| | Productivity [g/g] | $M_n \times 10^{-3}$ |
| None | 2.4 | 101.1 |
| $5.1 \times 10^{-5}$ | 2.1 | 13.9 |
| $2.6 \times 10^{-4}$ | 1.8 | 9.4 |
| $5.1 \times 10^{-4}$ | 1.1 | 78 12.9 |

TABLE 4-continued

| Acetic Acid Loading (moles/gm catalyst) | Polymer | |
|---|---|---|
| | Productivity [g/g] | $M_n \times 10^{-3}$ |
| $5.1 \times 10^{-3}$ | 0 | |

The data of Table 4 show that as the levels of the acetic acid increased, there was a corresponding decrease in the molecular weight of the polymer produced, although not much control over the molecular weight is evident after the initial reduction. On the other hand, productivity of the catalyst was greatly reduced, eventually reaching zero at the highest loading of acetic acid. These results are, therefore, different from those reported by Soga (cited above), who presented data showing that acetic acid could be used to reduce the molecular weight of a carbon dioxide propylene oxide copolymer when using a cobalt acetate catalyst without significant loss in productivity of the catalyst. This shows that the zinc dicarboxylate catalyst must be handled much differently from the cobalt acetate catalyst reported by Soga.

EXAMPLE V (Comparative Example)

An attempt was made to form a terpolymer of cyclohexene oxide, propylene oxide and carbon dioxide, using a zinc (II) glutarate catalyst and to study the effect of both glutaric acid and acetic acid on molecular weight control. The ratio of the cyclohexene oxide to propylene oxide was 70/30, the solvent was methylene chloride, temperature 85° C., pressure of 450 psig $CO_2$ for ten hours reaction time. The results are shown in Table 5.

TABLE 5

| Acid Loading (moles/gm catalyst) | | Polymer | |
|---|---|---|---|
| Glutaric | Acetic | productivity [g/g] | $M_n \times 10^{-3}$ |
| None | 0 | 4.0 | 91.2 |
| $3.8 \times 10^{-4}$ | 0 | 4.6 | 59.8 |
| $7.6 \times 10^{-4}$ | 0 | 4.6 | 38.9 |
| $7.6 \times 10^{-4}$ | 0 | 5.4 | 89.1 |
| $9.0 \times 10^{-4}$ | 0 | 0.5 | 59.7 |
| $1.5 \times 10^{-3}$ | 0 | 0.4 | 25.1 |
| 0 | $3.3 \times 10^{-4}$ | 0.2 | 20.8 |
| 0 | $3.3 \times 10^{-4}$ | 0.4 | 6.2 |

As shown above, the terpolymer using glutaric acid gave erratic results on the reduction of molecular weight at the lower acid loadings, but at the higher levels of glutaric acid, the molecular weight was reduced with a corresponding dramatic decrease in catalyst productivity. Likewise, acetic acid produced a decrease in molecular weight and almost total extinction of catalyst activity.

EXAMPLE VI (Invention)

Carbon dioxide and propylene oxide were copolymerized using a zinc (II) glutarate catalyst and methylene chloride solvent at 95° C. for five hours and 350 psig carbon dioxide pressure. Benzoic acid was added to the polymerization system at various levels, and the polymers recovered were measured for yield and number average molecular weight. The results are shown in Table 6.

TABLE 6

| Benzoic Acid Loading (moles/gm catalyst) | Polymer Productivity [g/g] | $M_n \times 10^{-3}$ |
|---|---|---|
| 0 | 13.0 | 100 |
| $2 \times 10^{-4}$ | 15.1 | 51 |
| $4.1 \times 10^{-4}$ | 14.5 | 39 |
| $7.0 \times 10^{-4}$ | 14.6 | 23 |
| $9.7 \times 10^{-4}$ | 14.5 | 22 |
| $1.5 \times 10^{-3}$ | 13.9 | 13 |
| $2.0 \times 10^{-3}$ | 13.2 | 10 |
| $4.1 \times 10^{-3}$ | 9.1 | 5.6 |
| $7.9 \times 10^{-3}$ | 6.4 | 5.7 |

The above data of Table 6 show efficient reduction of the polymer molecular weight by increasing the loading up to $4.1 \times 10^{-3}$ moles of proton donor per gram of catalyst. at which point productivity was adversely affected. At lower levels however, ($2 \times 10^{-4}$ to $2 \times 10^{-3}$ moles per gram of catalyst), the number average molecular weight was effectively reduced ten-fold with no loss, and more often a slight increase, in productivity. This was a totally unexpected result based upon the experience demonstrated with acetic and glutaric acids in such systems and the data reported by Soga for benzoic acid with the cobalt acetate catalyst.

EXAMPLE VII
(Invention)

The procedure of Example VI was repeated using as a proton donor different phenols, namely 4-isopropyl phenol and 4,4-isopropylidene diphenol (bisphenol-A). The results are shown in Table 7.

TABLE 7

| Phenol/Loading (moles/gm catalyst) | Polymer Productivity [g/g] | $M_n \times 10^{-3}$ |
|---|---|---|
| None | 11.4 | 115 |
| 4-i-propylphenol/$5.2 \times 10^{-4}$ | 15.4 | 41 |
| 4-i-propylphenol/$9.6 \times 10^{-4}$ | 18.0 | 35.0 |
| 4-i-propylphenol/$1.9 \times 10^{-3}$ | 14.4 | 15.0 |
| 4-i-propylphenol/$4.8 \times 10^{-3}$ | 4.6 | 7.5 |
| 4,4-isopropylidene diphenol (bisphenol-A)/$4.8 \times 10^{-4}$ | 13.7 | 31 |
| 4,4-isopropylidene diphenol (bisphenol-A)/$9.6 \times 10^{-4}$ | 11.1 | 14 |

The data of Table 7 show that both 4-isopropylphenol and bisphenol-A were quite effective for regulating molecular weight without adversely affecting catalyst productivity, provided the upper limits of the addition are not exceeded, for example, for 4-isopropylphenol, $4.8 \times 10^{-3}$ moles per gram of catalyst. At the lower loading levels the number average molecular weight of the polymer was reduced up to ten fold with actual increases in catalyst productivity. Bisphenol-A showed similar effectiveness.

EXAMPLE VIII
(Invention)

This example presents a survey of proton donors evaluated for their influence on the molecular weight of poly(propylene carbonates) formed by the copolymerization of carbon dioxide and propylene oxide over a zinc (II) glutarate catalyst. In the polymerization the solvent was methylene chloride, reaction temperature 85° C. and a carbon dioxide pressure of 350 psig. The amount of proton donor in each case was $9.6 \times 10^{-4}$ mole per gram of catalyst. Steric parameters ($E_s$) and acidity values ($pK_a$) are indicated for each proton donor where known. The steric parameter given is that of the substituent on the proton donor group. $E_s$ is based upon the first Taft equation (G. W. Klumpp, "Reactivity in Organic Chemistry", pages 142–143, J. Wiley & Sons (1982) for acid hydrolysis of esters and can be expressed as:

$$E_s = \log \frac{(k_x)}{k_{CH_3}}$$

Productivity in terms of grams of polymer produced per gram of catalyst and the number average molecular weight in thousands are given in Table 8 for each proton donor.

TABLE 8

| No. | Proton Donor | $pK_a$ | $E_s$ | Polymer Productivity [g/g] | $M_n \times 10^{-3}$ |
|---|---|---|---|---|---|
| 1 | none | — | — | 11.3 | 115 |
| 2 | Indene | 21 | | 10.9 | 149 |
| 3 | Acetylacetone | 9 | | 2.0 | 29 |
| 4 | t-Butanol | 19 | | 9.8 | 34 |
| 5 | t-Butylthiol | | | 5.8 | 19 |
| 6 | 1-Adamantamine | | | 0.4 | 10 |
| 7 | Phenol | 9.99 | | 15.5 | 25 |
| 8 | O-Cresol | 10.26 | | 16.2 | 21 |
| 9 | 2,6-Dimethyl Phenol | 10.59 | | 14.5 | 22 |
| 10 | Bisphenol-A | | | 11.0 | 14 |
| 11 | Acetic Acid | 4.76 | 0.00 | 3.3 | 10 |
| 12 | Propionic Acid | 4.87 | −0.07 | 6.6 | 12 |
| 13 | Butyric Acid | 4.83 | −0.36 | 7.3 | 10 |
| 14 | Phenylacetic Acid | 4.31 | −0.38 | 10.3 | 22 |
| 15 | Iso-Butyric Acid | 4.85 | −0.47 | 13.3 | 19 |
| 16 | Cyclohexanecarboxylic Acid | 4.90 | −0.79 | 14.0 | 21 |
| 17 | Trimethylacetic Acid | 5.08 | −1.54 | 15.9 | 25 |
| 18 | 2-Propylpentanoic Acid | | −2.11 | 13.3 | 28 |
| 19 | Benzoic Acid | 4.21 | −0.90 | 14.3 | 18 |
| 20 | m-Chlorobenzoic Acid | 3.82 | | 12.2 | 19 |
| 21 | 9-Anthracene Carboxylic Acid | 3.65 | | 15.1 | 22 |
| 22 | Chloroacetic Acid | 2.87 | −0.24 | 1.7 | 7 |
| 23 | Trichloroacetic Acid | 0.64 | −2.06 | 1.1 | 12 |
| 24 | Trifluoroacetic Acid | 0.25 | −1.16 | 0.3 | 9 |

The data of Table 8 show that to be effective in reducing molecular weight, the donor must be a stronger acid than indene and therefore have an acidity value of ($pK_a$) below 20. The data also show that both propionic acid and butyric acid as well as acetic acid produced unacceptable losses in catalyst activity, even though there was some reduction in the molecular weight. The chloroacetic acids also were too damaging to catalyst activity, indicating that their strongly acidic nature ($pK_a$ less than 3.0), killed polymerization. On the other hand, compounds which can strongly bond to the zinc (II) of the catalyst. such as sulfur and nitrogen derivatives and oxygen derivatives with sterically undemanding substituents, inhibit the polymerization. The steric requirements are indicated to include the moderately sterically hindered proton donors with $E_s$ of −0.38 or below.

EXAMPLE IX (Invention)

This example demonstrates the influence of other variables on the molecular weight and productivity of the catalyst, using a polymerization of carbon dioxide and propylene oxide in the presence of a zinc (II) glutarate catalyst in methylene chloride and 350 psig carbon dioxide, except as indicated for two runs in which hexane was used as the solvent. The results are presented in Table 9.

TABLE 9

| Process | | | Polymer | |
|---|---|---|---|---|
| Temp. [°C.] | Variable Time [h] | Benzoic Acid Loading (moles/gm catalyst) | Productivity [g/g] | $M_n \times 10^{-3}$ |
| 65 | 4 | $9.7 \times 10^{-4}$ | 9.4 | 17 |
| 75 | 4 | $9.7 \times 10^{-4}$ | 14.9 | 22 |
| 85 | 4 | $9.7 \times 10^{-4}$ | 14.3 | 18 |
| 95 | 5 | $9.7 \times 10^{-4}$ | 14.5 | 22 |
| 105 | 4 | $9.7 \times 10^{-4}$ | 7.7 | 13 |
| 95 | 5 | $4.1 \times 10^{-4}$ | 14.5 | 39 |
| 95 | 10 | $4.1 \times 10^{-4}$ | 15.8 | 42 |
| 95 | 20 | $4.1 \times 10^{-4}$ | 20.9 | 38 |
| 85$^a$ | 4 | $9.6 \times 10^{-4}$ | 16.4 | 22 |
| 85$^a$ | 4 | $1.5 \times 10^{-3}$ | 13.1 | 16 |

$^a$hexane solvent

The data of Table 9 show process variables have no practical effect on molecular weight control of the polypropylene carbonate in the presence of benzoic acid with the zinc (II) glutarate catalyst. The molecular weight of the polymer is controlled by the concentration of the proton donor, not by reaction solvent, temperature, time or carbon dioxide pressure.

EXAMPLE X (Invention)

This example demonstrates that the invention can be applied to other poly(alkylene carbonates) made with the zinc (II) dicarboxylate catalyst. In this case, carbon dioxide and ethylene oxide were copolymerized using methylene chloride solvent, 70° C. reaction temperature, 350 psig carbon dioxide pressure and benzoic acid at various levels as the sterically hindered proton donor. The results are shown in Table 10.

TABLE 10

| Benzoic Acid Loading | Polymer | |
|---|---|---|
| (moles/gm catalyst) | Productivity [g/g] | $M_n \times 10^{-3}$ |
| none | 17.3 | 113 |
| $4.1 \times 10^{-4}$ | 18.9 | 46 |
| $1.0 \times 10^{-3}$ | 17.0 | 27 |
| $1.6 \times 10^{-3}$ | 13.9 | 14 |

The data of Table 10 show that if a maximum level of benzoic acid is not exceeded (in this case $1.6 \times 10^{-3}$), molecular weight reduction of poly(ethylene carbonate) is quite effective and productivity of the catalyst is not affected.

EXAMPLE XI (Invention)

This example shows the results of molecular weight control of poly(propylene carbonate) with isopropyl benzoic acid using a zinc (II) glutarate catalyst. The isopropyl benzoic acid was used at levels of 0.03, 0.15 and 0.30 grams and 1.7 grams of catalyst was used for each run. 150 cc's of hexane was used as a solvent and 60 cc's of propylene oxide with a carbon dioxide pressure of 450 psig at a reaction temperature of about 85° C. for 4 hours. The polymer was taken from the reactor and dried at 80° F. in vacuum overnight. Productivity and molecular weights of the polymer product are shown in Table 11.

TABLE 11

| Iso-propylbenzoic Acid | | Productivity | Molecular Weight |
|---|---|---|---|
| g. | % of catalyst | (g.pol./g.cat.) | ($M_n \times 10^{-3}$) |
| 0 | 0 | 15.4 | 135.2 |
| 0.03 | 1.77 | 14.4 | 86.7 |
| 0.15 | 8.8 | 15.2 | 33.2 |
| 0.30 | 17.7 | 14.9 | 23.7 |

The data of Table 11 also show that isopropyl benzoic acid is an effective sterically hindered proton donor for use in controlling poly(alkylene carbonate) molecular weight when used with a Zn dicarboxylate catalyst without adversely affecting the catalyst activity.

These and other aspects and embodiments of my invention will be apparent to those skilled in the art without departing from the spirit or scope of my invention.

I claim:

1. A process for making a poly(alkylene carbonate) having a desired molecular weight which comprises contacting under copolymerization conditions carbon dioxide and one or more oxirane compounds in the presence of a catalytic amount of a zinc polycarboxylate catalyst and an amount of sterically hindered organic proton donor sufficient to reduce the molecular weight of the poly(alkylene carbonate) from that which would have been formed without said proton donor being present, but insufficient to reduce significantly the productivity of said catalyst over the course of the reaction, said proton donor having an acidity of 3 to 20 p$K_a$ and a steric parameter ($E_s$) of $-0.38$ or less.

2. The process of claim 1 wherein said zinc polycarboxylate catalyst has been formed by the reaction of zinc oxide, hydroxide or salt with a polycarboxylic acid or anhydride.

3. The process of claim 2 wherein said zinc polycarboxylate catalyst is a zinc dicarboxylate.

4. The process of claim 3 wherein said zinc dicarboxylate has been formed by the reaction of zinc oxide with glutaric acid or adipic acid.

5. The process of claim 1 wherein said oxirane compound, has the general formula:

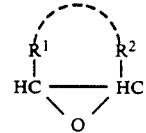

wherein $R^1$ is H, $CH_3$, $C_2H_5$, $C_3H_7$, $C_4H_9$, $C_6H_5$ or $C_6H_{11}$ and $R^2$ is H or $CH_3$, or $R^1$ and $R^2$ together complete a ring compound.

6. The process of claim 5 wherein $R_2$ is H.

7. The process of claim 1 wherein said oxirane compound is ethylene oxide or propylene oxide and said poly(alkylene carbonate) is an alternating copolymer of carbon dioxide with ethylene oxide or propylene oxide.

8. The process of claim 1 wherein said sterically hindered organic proton donor has an acidity of 3.6 to 10.6 $pK_a$.

9. The process of claim 7 wherein said catalyst is zinc glutarate made from zinc oxide and glutaric acid.

10. The process of claim 7 wherein said proton donor is selected from phenol, 4-isopropylphenol, o-cresol, 2,6-dimethylphenol, bisphenol A, phenylacetic acid, iso-butyric acid, cyclohexanecarboxylic acid, trimethylacetic acid, 2-propylpentanoic acid, benzoic acid, isopropylbenzoic acid, m-chlorobenzoic acid, and 9-anthracene carboxylic acid.

11. A process for making poly(propylene carbonate) of controlled molecular weight which comprises contacting propylene oxide and carbon dioxide in a solvent with a catalytic amount of zinc (II) glutarate formed from zinc oxide and glutaric acid and in the presence of a molecular weight controlling amount of a sterically hindered organic proton donor.

12. The process of claim 11 wherein said solvent is methylene chloride or hexane and said proton donor has intermediate acidity ($pK_a$) of 3.6 to 10.6 and a steric parameter ($E_s$) of −0.38 or below.

13. The process of claim 11 wherein said proton donor is benzoic acid.

14. The process of claim 11 wherein said proton donor is a phenol.

* * * * *